United States Patent [19]

Inoue

[11] Patent Number: 5,222,005

[45] Date of Patent: Jun. 22, 1993

[54] LOADING UNIT FOR CASE WHICH HOUSES RECORDING DISK

[75] Inventor: Kazuhiko Inoue, Houya, Japan

[73] Assignee: Teac Corporation, Japan

[21] Appl. No.: 745,225

[22] Filed: Aug. 14, 1991

[30] Foreign Application Priority Data

Aug. 20, 1990 [JP] Japan .................................. 2-218491

[51] Int. Cl.$^5$ ............................................. G11B 21/22
[52] U.S. Cl. .................................. 360/99.06; 360/105
[58] Field of Search ..................... 360/99.06, 104, 105, 360/109, 99.02, 75; 369/75.1, 77.1, 78

[56] References Cited

U.S. PATENT DOCUMENTS

| | | | |
|---|---|---|---|
| 4,315,293 | 2/1982 | Winkler | 360/105 |
| 4,742,410 | 5/1988 | Smith | 360/105 |
| 4,853,806 | 8/1989 | Tamada | 360/105 |
| 4,999,725 | 3/1991 | Takahashi | 360/105 |

Primary Examiner—David P. Porta
Attorney, Agent, or Firm—Andrus, Sceales, Starke & Sawall

[57] ABSTRACT

A loading unit loads a case housing a disk recording medium at a loading position which is set between an upper head and a lower head. The loading unit includes: an insertion path for guiding the case inserted from an insertion opening toward a position between the upper head and the lower head; a loading mechanism for moving the case toward the lower head and loads the case at the loading position when the case reaches a predetermined position in the insertion path; and a protector block having a slide surface, the protector block being provided closer to the first head so that a first distance between the slide surface and a upper surface of the case is less than or equal to a second distance between the first surface of the case and the upper head in a state where the case is in the insertion path.

15 Claims, 15 Drawing Sheets

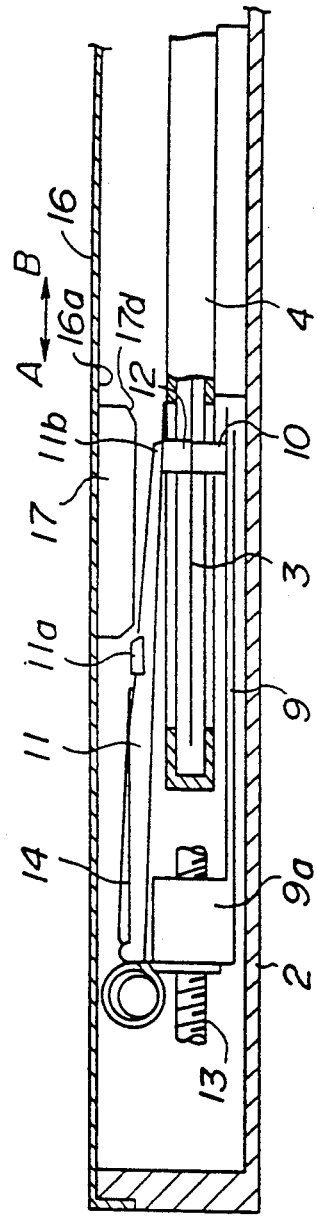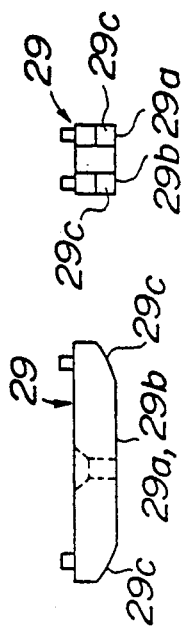

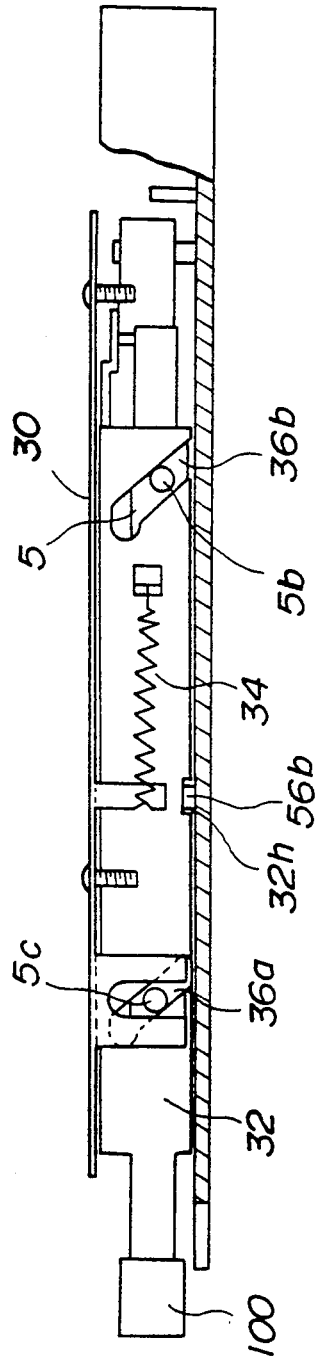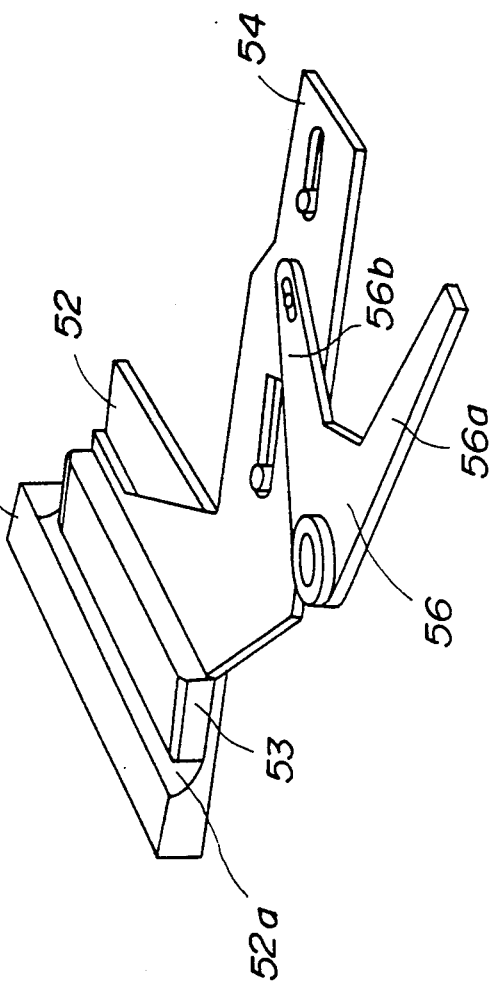

LOADING UNIT FOR CASE WHICH HOUSES RECORDING DISK

BACKGROUND OF THE INVENTION

The present invention generally relates to a loading unit for a case housing a recording disk, and more particularly to a loading unit for a case housing a recording disk which is used in a recording and/or reproducing apparatus, such as a magnetic disk apparatus, an optical disk apparatus, and a magneto optic disk apparatus.

A loading unit is used in a magnetic disk apparatus which is a type of recording and/or reproducing apparatus. For example, a 3.5-inch floppy disk is housed in a disk cartridge which is a thin rectangular case. This disk cartridge has an opening covered by a shutter. In a disk drive unit which drives the 3.5-inch floppy disk housed in the disk cartridge, when the disk cartridge is loaded at a predetermined position (referred to as a loaded position) in the disk drive unit, the shutter of the disk cartridge is opened and then magnetic heads are brought via the opening into contact with respective surfaces of the 3.5-inch floppy disk. The magnetic heads comprise an upper head and a lower head. The upper head is mounted at an end of an arm which is supported by a carriage so as to be capable of pivoting on a predetermined axis in an up-down direction, and the lower head is fixed on the carriage. In a case where the disk cartridge is not loaded into the disk drive unit, the upper head and the lower head are separated from each other by a predetermined distance. The disk cartridge is inserted between the upper head and the lower head in such a way that the disk cartridge is not in contact with the lower head. In addition, the upper head is displaced by a pivot operation of the arm to a predetermined position so that the disk cartridge is not in contact with the upper head.

How to make the disk drive unit using the loading unit thin has been examined. That is, it has been examined how to bring the position to which the upper head is displaced close to the disk cartridge and to decrease the distance between the lower head and the disk cartridge under a condition in which the disk cartridge is inserted between the upper head and lower head. However, as there is a possibility that the disk cartridge will hit and damage the upper head or the lower head when it is inserted between them due to dimensional tolerances and deformation of the disk cartridge and other parts, the conventional disk drive unit cannot be made thin.

SUMMARY OF THE INVENTION

Accordingly, a general object of the present invention is to provide a novel and useful loading unit for a case housing a recording disk in which the disadvantages of the aforementioned prior art are eliminated.

A more specific object of the present invention is to provide a loading unit for a case housing a recording disk which can be made thinner and in which the case housing the recording disk can be loaded without damaging the heads.

The above objects of the present invention are achieved by a loading unit for loading a case housing a disk recording medium at a loading position which is set between a first head and a second head, the first head recording information in and/or reproducing information from a first side of the disk recording medium, the second head recording information in and/or reproducing information from a second side of the disk recording medium, the loading unit comprising: an insertion path for guiding the case inserted from an insertion opening toward a position between the first head and the second head; a loading mechanism for moving the case toward the second head and for loading the case at the loading position when the case reaches a predetermined position in the insertion path; and a first protector member having a first slide surface, the first protector being provided close to the first head so that a first distance between the first slide surface and a first surface of the case is less than or equal to a second distance between the first surface of the case and the first head in a state where the case is in the insertion path, the first surface of the case facing the first head.

The above objects of the present invention are also achieved by the above loading unit further comprising: a second protector member having a second slide surface, the second protector being provided close to the second head so that a third distance between the second slide surface and a second surface of the case is less than or equal to a fourth distance between the second surface of the case and the second head in a state where the case is in the insertion path, the second surface of the case facing the second head; and a protector moving mechanism, operatively connected to the loading mechanism, for moving the second protector in a predetermined direction so that the case is prevented from moving when the loading mechanism moves the case toward the second head.

According to the present invention, the first protector member prevents the case from contacting to the first head. Further the second member prevents the case from contacting to the second head. Thus, even if the case has dimensional tolerances and deformation, the recording apparatus such as a floppy disk unit can be thinner.

Additional objects, features and advantages of the present invention will become apparent from the following detailed description when read in conjunction with the accompanying drawings.

BRIEF DESCRIPTION OF THE DRAWINGS

FIG. 8 is a cross sectional view of the disk driving unit in a state where the case is loaded at the loading position;

FIGS. 9A, 9B, and 9C are a diagram illustrating a modification of the protector block;

FIG. 17 is a cross sectional view of the disk driving unit in a state where the disk cartridge is loaded at the loading position;

FIG. 19 is a perspective view of the movable protector in a state where the disk cartridge is loaded in the disk driving unit.

DESCRIPTION OF THE PREFERRED EMBODIMENTS

A description will now be given of a first embodiment of the present invention with reference to FIGS. 1 through 4.

Figure 1:
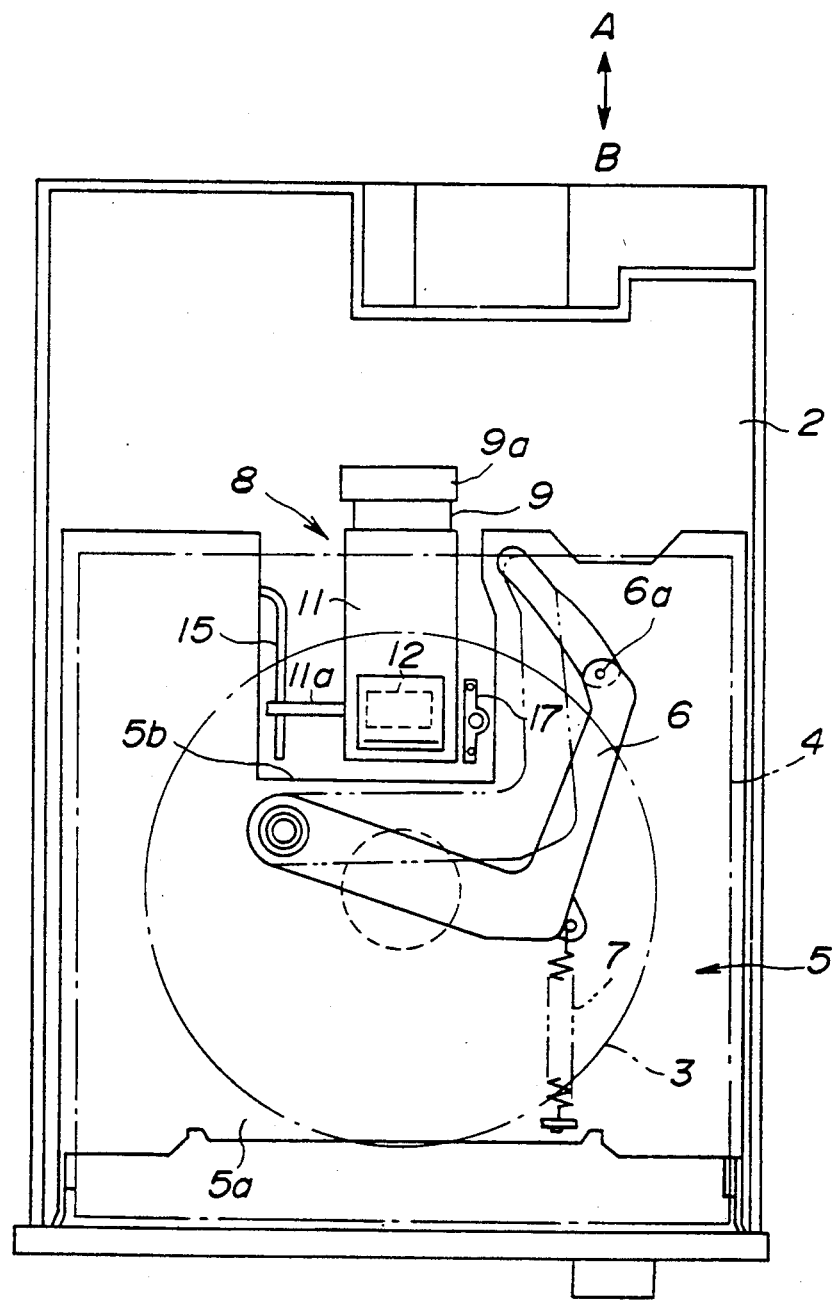
FIG. 1 is a plan view of a disk driving unit according to a first embodiment of the present invention.

FIGS. 1 through 4 show a disk driving unit used in a floppy disk recording apparatus. Referring to FIGS. 1 through 4, in this disk driving unit, a holder 5, in which a cartridge 4 shown by a chain line in FIG. 1 is inserted, is provided on a chassis 2 so as to be capable of moving in up and down directions perpendicular to a bottom surface of the chassis 2. The cartridge 4 houses a 3.5-inch floppy disk. An opening 5b is formed on an upper plate 5a of the holder 5 so that the holder 5 can be prevented from contacting a magnetic head assembly 8 mounted on the chassis 2. A shutter lever 6 for opening a shutter (not shown) of the disk cartridge 4 is provided on the upper plate 5a of the holder 5. The shutter lever 6 is pulled by a coil spring 7 in a clockwise direction and has an engaging pin 6a which projects from a rear surface of the shutter lever 6 inside the holder 5. The shutter lever 6 pivots on a shaft when the disk cartridge 4 is inserted into the holder 5 so that the shutter of the cartridge 4 with which the engaging pin 6a engages is opened.

Figure 3:
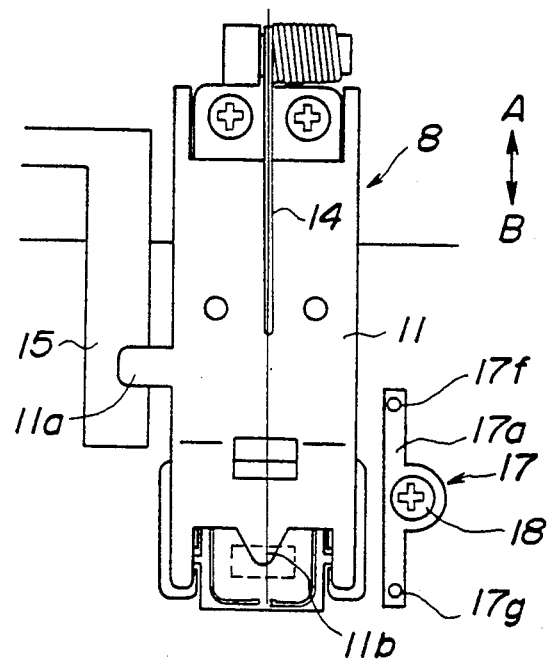
FIG. 3 is an enlarged plan view illustrating a magnetic assembly.
Figure 4:
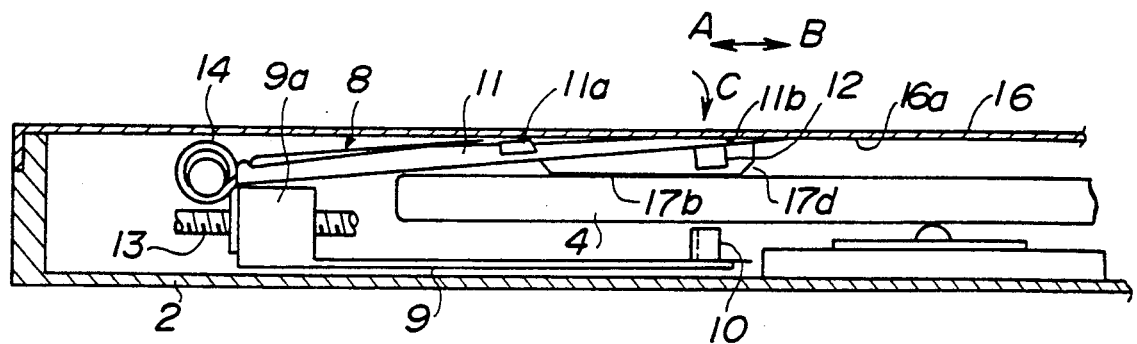
FIG. 4 is a sectional view of the disk driving unit in a state where the disk cartridge is not loaded at a loading position.

The magnetic head assembly 8 has a carriage 9 which is provided on the chassis 2 so as to be capable of moving in a radial direction of the floppy disk (shown by A and B in FIGS. 3 and 4), a lower head 10 mounted at an end of an upper surface of the carriage 9, an arm 11 which is pivotably supported on a base block 9a of the carriage 9, and an upper head 12 mounted at an end of a lower surface of the arm 11, as shown in FIGS. 3 and 4. The carriage 9 is engaged with a lead screw 13 which is rotated by a stepping motor (not shown) so that the cartridge 9 moves on the chassis 2 in the directions A and B in accordance with the rotation of the lead screw 13. That is, due to the driving of the stepping motor, a tracking of the lower head 10 and the upper head 12 with respect to the floppy disk is carried out. A torsion spring 14 which is mounted on the base block 9a of the carriage 9 operates on an end of the arm 11 in a direction shown by C in FIG. 4. A supporting part 11a projects from a side end of the arm 11. The supporting part 11a of the arm 11 is in contact with a lifter 15. In a case where the disk cartridge 4 is not inserted in the holder 5, the arm 11 is lifted up by the lifter 15 so that a leading end 11b of the arm 11 is in contact with a back side 16a of a cover 16 which covers the chassis 2.

Figure 5A:
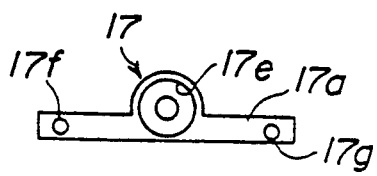
FIGS. 5A, 5B, and 5C are a diagram illustrating a protector block.
Figures 5B, 5C:
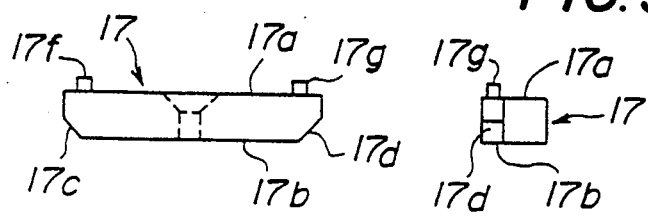

A protector block 17 is mounted by a screw 18 on the back side 16a of the cover so as to be arranged at the side of the upper head 12. The protector block 17 projects from the back side 16a of the cover 16 toward the opening 5b of the holder 5. The protector block 17 is made of, for example, synthetic resin. The surface of the protector block 17 has a low frictional resistance. The protector block 17 has an upper surface 17a which is in contact with the back side 16a of the cover 16, a slide surface 17b which extends in a direction in which the disk cartridge 4 is inserted, and inclined surfaces 17c and 17d which are formed at ends of the slide surface 17b, as shown in FIG. 5. A hole 17e, in which the screw 18 for mounting the protector block 17 is inserted, is formed at a center portion of the protector block. Bosses 17f and 17g project from the upper surface of the protector block 17 at both ends thereof.

In addition, holes (not shown) with which the bosses 17f and 17g of the protector block 17 are engaged are formed on the back side 16a of the cover 16. A mounting hole (not shown) with which the screw 18 is engaged is also formed on the back side 16a of the cover 16.

Before the disk cartridge 4 is completely loaded at a loaded position, the upper head 12 is maintained at a position closer to a surface on which the disk cartridge 4 is slid than that in a conventional disk driving unit. In addition, in this case, the lead end 11b of the arm 11 is in contact with the back side 16b of the cover 16. Thus, in the case before the disk cartridge 4 is completely loaded at the loaded position, the distance between the arm 16 and the cover 11 and the clearance between the upper head 12 and the disk cartridge 4 are respectively much less than those in the conventional disk driving unit. That is, the distance between the bottom surface of the chassis 2 and the cover 16 is much less than that of the conventional disk driving unit, so that a thinner disk driving unit is obtained.

The closer a portion of th arm 11 is to the leading end 11b, the thinner the arm 11 becomes, as shown in FIG. 4, so that the distance between the upper head 12 and the lower head 10 becomes as large as possible when the arm 11 is in contact with the cover 16.

Figure 6:
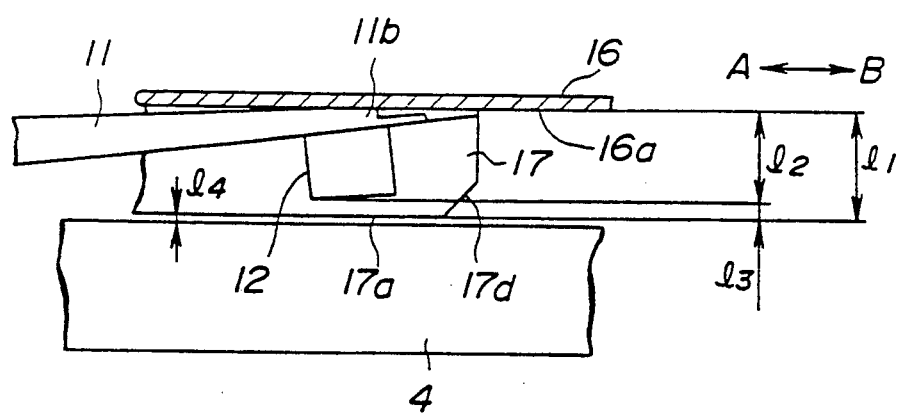
FIG. 6 is an enlarged side view of an essential part of the disk driving unit.

Referring to FIG. 6 showing dimensions of the protector block 17, the upper head 12, and the disk cartridge 4, the protector block 17 projects from the back side 16a of the cover 16 by $l_1$. In a case where the leading end 11b of the arm 11 is in contact with the cover 16, the distance between a leading end of the upper head 12 and the back side 16a of the cover 16 is $l_2$, which is less than $l_1$. In this first embodiment, for example, $l_1$ is set to 3 mm ($l_1 = 3$ mm) and $l_2$ is set to 2.8 mm ($l_2 = 2.8$ mm). Thus, in this case, a distance $l_3$ ($= l_1 - l_2$) between the leading end of the upper head 12 and the slide surface of the protector block 17 becomes equal to 0.2 mm ($l_3 = 0.2$ mm). A distance $l_4$ between the surface of the cartridge 4 inserted in the holder 5 and the slide surface 17b of the protector block 17 is very small or can be approximately zero. It is preferable that the above distance $l_3$ between the leading end of the upper head 12 and the slide surface 17b of the protector block 17 be within a range between 0 and 0.4 mm.

In the above case, the disk cartridge 4 is substantially slid on the slider surface 17b of the protector block 17, so that the disk cartridge 4 is inserted in the holder 5 under a condition in which the distance between the surface of the disk cartridge 4 and the upper head 12 is maintained at approximately 0.2 mm. Thus, the disk cartridge 4 is prevented from being brought into contact with the upper head 12. On the other hand, in the conventional disk driving unit, there is a space between the lead end 11b of the arm 11 and the cover 16, and the distance between the upper head 12 and the disk cartridge 4 is greater than or equal to 1 mm. Thus, the disk driving unit according to the first embodiment of the present invention can be thinner than the conventional one by using the protector block 17.

Figure 2:
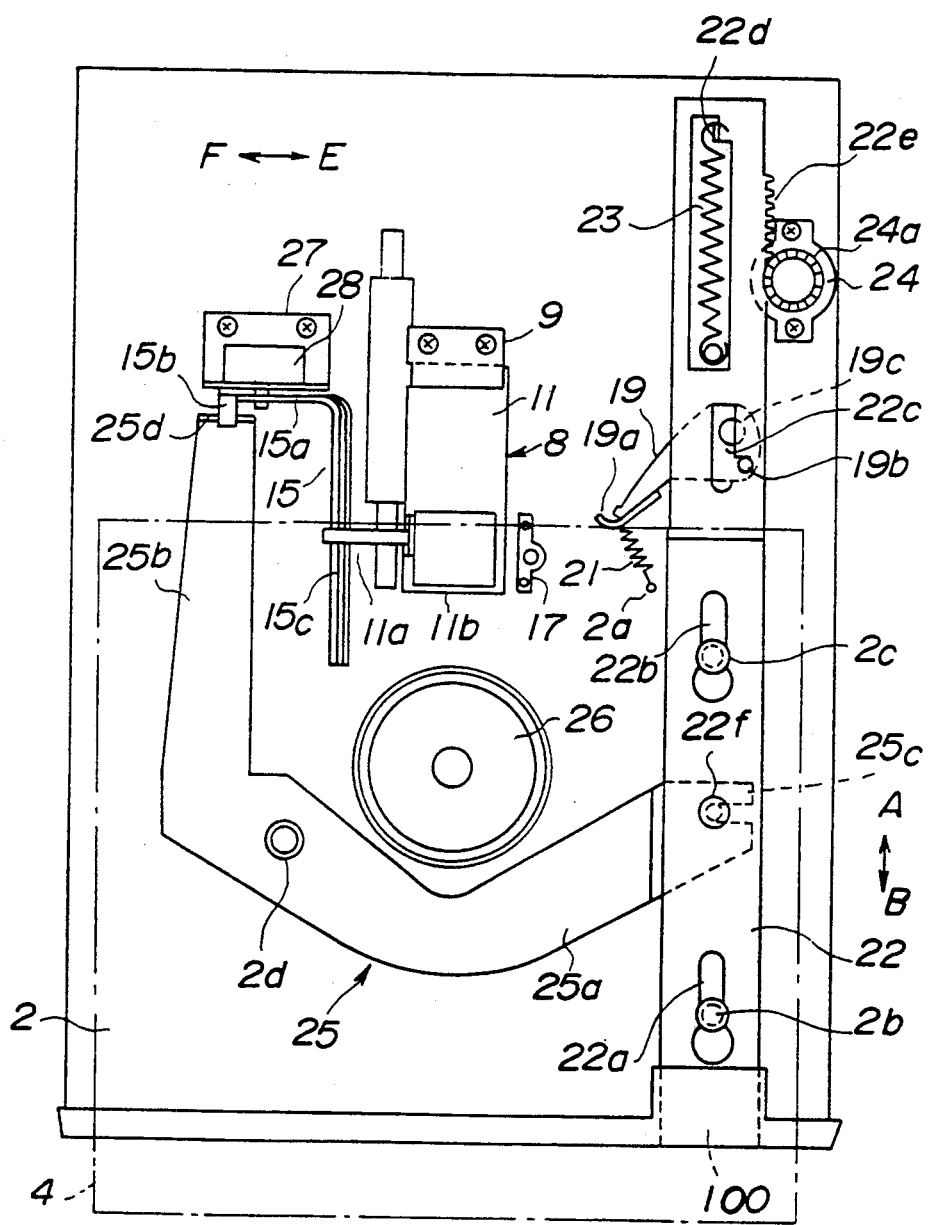
FIG. 2 is a plane view of the disk driving unit in a state a holder is removed.

Referring to FIG. 2, a description will now be given of a lifter mechanism which makes the arm 11 go up and down.

Referring to FIG. 2, a latch lever 19 has a contact part 19a with which a lead end of the disk cartridge 4 is brought into contact with and an engagement part 19b which is engaged with a slide lever 22 which will be described later. The latch lever 19 is pivotably supported on a shaft 19c. A coil spring 21 is provided between a pin 2a fixed on the bottom surface of the chassis 2 and an end of the latch lever 19 so that the latch lever 19 is rotatively pulled in the counterclockwise direction by the coil spring 21. The slide lever 22 is slidably provided at a side of the chassis 2. The slide lever 22 has slotted holes 22a and 22b. Pins 2b and 2c which are fixed on the bottom surface of the chassis 2 are respectively engaged with the slotted holes 22a and 2b so that the slide lever 22 can slide in directions A and B in which the disk cartridge 4 is respectively inserted and ejected. The slide lever 22 also has a T-shaped hole 22c with which the engagement part 19b of the latch lever 19 is engaged. Before the disk cartridge 4 is completely loaded at the loaded position, the slide lever 22 is stopped at a position in the direction A by the engagement part 19b of the latch lever 19. A coil spring 23 is provided between the chassis 2 and an end part 22d of the slide lever 22. That is, an end of the coil spring 23 is fixed on the chassis 2 and another end of the coil spring 23 is fixed on the end part 22d of the slide lever 22, so that the slide lever 22 is pulled by the coil spring 23 in the direction B. A damper 24 is mounted on the chassis 2. The damper 24 has a gear 24a which is engaged with a rack 22e formed on a side edge of the slide lever 22. When the slide lever 22 moves in the directions A and B, a load caused by the rotation of the gear 24a of the damper 24 is transported to the rack 22e, so that a speed of the slide lever 22 is decreased.

A link arm 25 is pivotably supported on a shaft 2d projecting from the bottom surface of the chassis 2. The link arm 25 has a first arm 25a and a second arm 25b. The first arm 25a is extended in a direction substantially perpendicular to the direction A and B and curved so as to avoid a turn table 26. The second arm 25b is extended in a direction substantially perpendicular to the first arm 25a (the direction A). An engagement part 25c having a fork shape is formed at an end of the first arm 25a, and the engagement part 25c is engaged with a pin 22f which projects from a back side of the slide lever 22. Thus, when the slide lever slides in the directions A and B, the link arm 25 pivots on the shaft 2d. An engagement part 25d having a fork shape is formed at an end of the second arm 25b so as to project from the surface of the second arm 25b in a direction perpendicular thereto. An eject button 100 is mounted on a leading end of the slide lever 22. When the eject button 100 is pushed in the direction A, the disk cartridge 4 is ejected from this disk driving unit.

Figure 7A:
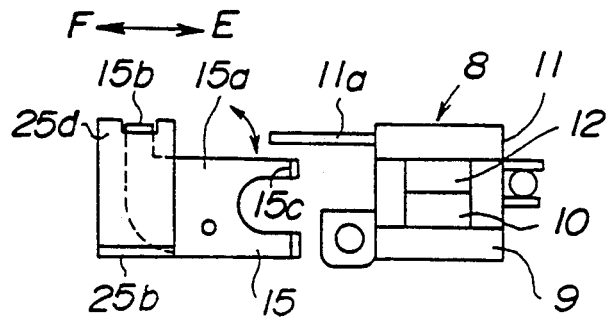
FIGS. 7A, 7B, and 7C are a diagram illustrating a mechanism for lifting an upper head.
Figure 7B:
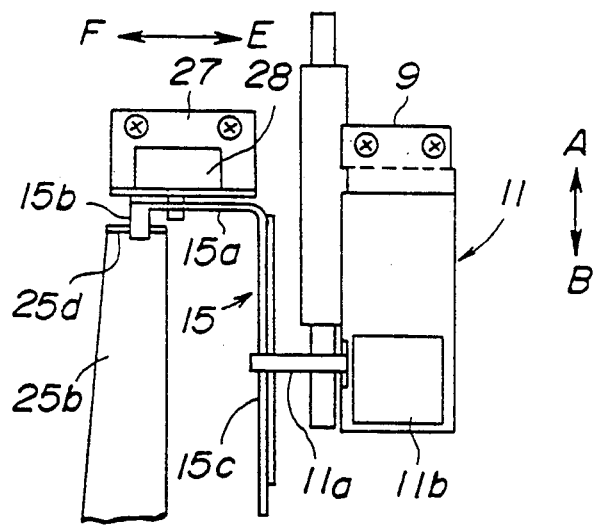
Figure 7C:
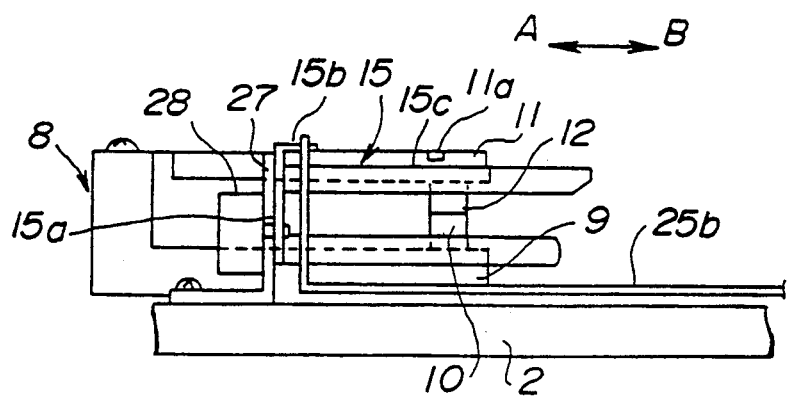
Figure 10:
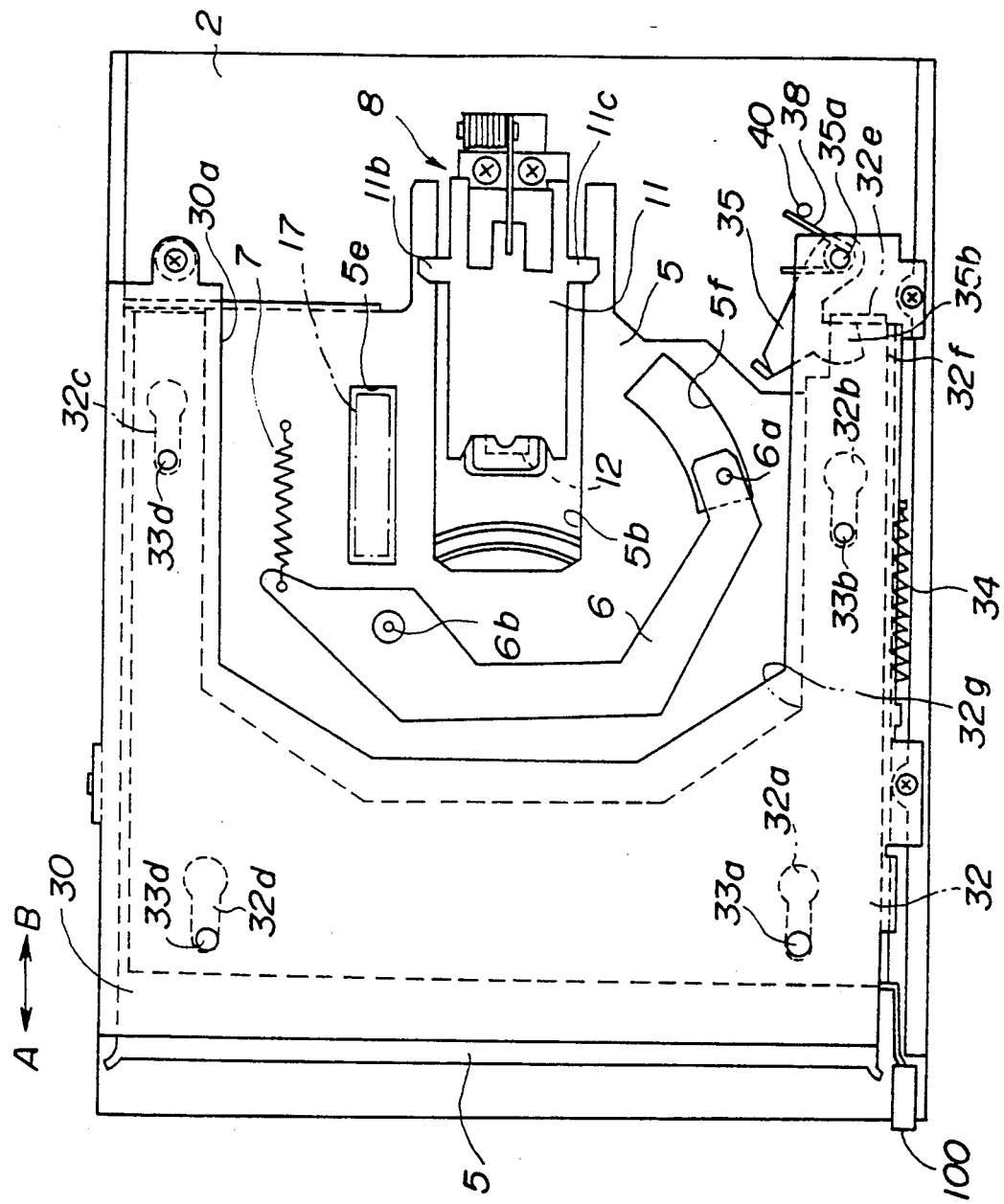
FIG. 10 is a plan view of a disk driving unit according to a second embodiment of the invention.

The lifter 15 is formed as shown in FIG. 7 (A), (B) and (C).

Referring to FIG. 7 (A), (B) and (C), the lifter 15 has a supporting part 15a, a projection part 15b, and an extended part 15c. The supporting part 15a is pivotably supported by a shaft of a damper 28 which is mounted on a bracket 27 fixed on the chassis 2. The projection part 15b projects from the supporting part 15a and is engaged with the engagement part 25d of the link arm 25. The extended part 15c extends from the supporting part 15a in the direction B. The extended part 15c is positioned under the supporting part 11a projecting from the side end of the arm 11 of the magnetic head assembly 8. Before the disk cartridge 4 is completely loaded at the loaded position, the lifter 15 is pivoted on the shaft of the damper 28 so as to be maintained at a position shown in FIG. 7 (A). The damper 28 smoothens the pivoting operation of the lifter 15.

A description will now be give of a loading and ejecting operation of the disk cartridge 4 in the above disk driving unit.

Before the disk cartridge 4 is inserted into the disk driving unit, the disk driving unit is maintained in a state as shown in FIGS. 2 and 4. That is, the slide lever 22 has been stopped at the end position in the direction A and the arm 11 of the magnetic head assembly 8 has been pivoted on the base block 9a of the carriage 9 to a position at which the leading end 11b of the arm 11 is in contact with the back side 16a of the cover 16.

When the disk cartridge 4 is inserted into the holder 5 in the disk driving unit as shown by a chain line in FIG. 2, the leading end of the disk cartridge 4 moves close to the end surface of the upper head 12. The leading end of the disk cartridge 4 is brought into contact with the inclined surface 17d of the protector block 17 which extends in the directions A and B parallel to an insertion direction of the disk cartridge 4. Then the disk cartridge 4 is guided by the slide surface 17b of the protector block 17 so that there is a space between the surface of the disk cartridge 4 and the end surface of the upper head 12. Thus, even though the disk driving unit becomes thinner, the disk cartridge 4 is prevented from being brought in contact with the upper head 12. Since the protector block 17 is formed of synthetic resin whose surface has a low frictional resistance, the disk cartridge can be smoothly slid on the protector block 17 and the disk cartridge 4 is not damaged by the protector block 17.

Further, when the disk cartridge 4 is inserted in the direction A, the latch lever 19 pivots on the shaft 19c in the clockwise direction. Thus, the engagement part 19b of the latch lever 19 is disengaged from the T-shaped hole 22c of the slide lever 22, and then the slide lever 22 which is pulled by the coil spring 23 slides in the direction B. At this time, the slide lever 22 is smoothly moved by the operation of the damper 24. While the slide lever 22 is sliding in the direction B, the holder 5 into which the disk cartridge 4 is inserted moves downward in a direction perpendicular to the bottom surface of the chassis 2. A mechanism which makes the holder 5 moves downward while the slide lever 22 is sliding is well known. Thus, a description of this mechanism is omitted.

When the holder 5 completely moves downward in the direction perpendicular to the bottom surface of the chassis 2, the disk cartridge 4 inserted into the holder 5 is loaded at the loaded position so that the magnetic disk 3 (the 3.5-inch floppy disk) is set on a turn table 26.

When the slide lever 22 slides in the direction B as described above, the link arm 25 which is engaged with the pin 22f of the slide lever 22 pivots on the shaft 2d in the clockwise direction. Thus, the engagement part 25d of the link arm 25 moves in a direction E, so that the lifter 15 which is engaged with the engagement part 25d of the link arm 25 pivots on the shaft of the damper 28 in the clockwise direction, as shown in FIG. 7 (A). As a result, the arm 11 whose supporting part 11a is supported by the extended part 15c of the lifter 15 is moved so that the upper head 12 moves downward. Then the upper head 12 is brought into contact with the upper surface of the magnetic disk 3 in the disk cartridge 4. At this time, the lower head 10 is brought into contact with the lower surface of the magnetic disk 3 in the disk cartridge 4. After this, the magnetic disk 3 is rotated by a rotation of the turn table 26, and the lower head 10 and the upper head 12, which are in contact with the surfaces of the magnetic disk 3, record the information in and/or reproduce the information from the magnetic disk 3.

Next, when the eject button 100 is pushed in the direction A, the disk cartridge 4 is ejected from the disk driving unit.

When the slide lever 22 is moved in the direction A by pushing the eject button 100, the holder 5 moves upward in the direction perpendicular to the bottom surface of the chassis 2 so that the disk cartridge 4 is separated from the turn table 26. The pin 19b of the latch lever 19 is engaged with the T-shaped hole 22c of the slide lever 22, and then the latch lever 19 is pivoted on the shaft 19c in the counterclockwise direction by the sliding of the slide lever 22 in the direction A. In addition, when the slide lever 22 slides in the direction A, the link arm 25 pivots on the shaft 25d, so that the projection part 15b of the lifter 15 which is engaged with the engagement part 25d of the link arm 25 is moved in a direction F. Thus, the extended part 15c of the lifter moves upward so that the leading end 11b of the arm 11 on which the upper head 12 is mounted is brought into contact with the cover 16. At this time, the disk cartridge 4 is pushed by the latch lever 19 which pivots on the shaft 19c in the counterclockwise direction so as to be ejected from the disk driving unit in the direction B. When the disk cartridge 4 is ejected, the disk cartridge 4 is positioned closer to the upper head 12 due to the holder 5 moving upward. The disk cartridge 4 is ejected in the direction B under a condition in which the upper surface of the disk cartridge 4 slides on the slide surface 17b of the protector block 17. Thus, also in a case where the disk cartridge 4 is ejected from the disk driving unit, the protector block 17 prevents the disk cartridge 4 from being brought into contact with the upper head 12.

A plurality of protector blocks, which are positioned at both sides of the magnetic head assembly 8, can be mounted on the back side 16a of the cover 16. The protector block 17 can be mounted at any position. Thus, the protector block 17 can be mounted at position other than the above one so that the disk cartridge 4 in the holder 5 is prevented from being brought into contact with the upper head 12.

The protector block can be also formed as shown in FIG. 9.

Referring to FIG. 9, a protector block 29 has a pair of slide parts 29a and 29b which are parallel to each other. Curve parts 29c are formed at both ends of each of the slid parts 29a and 29b. Each curve portion has an arc shape. As the protector block 29 shown in FIG. 9 has the pair of slid parts 29a and 29b, an area of the protector block 29 which is used to guide the disk cartridge 4 is large, and the disk cartridge 4 is guided by two sliding parts. Thus, the disk cartridge 4 can be stably guided by the protector block 29 shown in FIG. 9. In addition, as the leading end of the disk cartridge 4 slides on the curve parts 29c and the slid parts 29a and 29b of the protector block 29, the disk cartridge 4 can be smoothly inserted in the holder 5.

A description will now give of a second embodiment of the present invention with reference to FIGS. 10 through 20.

FIGS. 10 through 13 show a basic structure of a disk driving unit under a condition in which a disk cartridge housing a 3.5-inch floppy disk is not loaded therein. Referring to FIGS. 10 through 13, a magnetic head assembly 8 in which an upper head 12 is mounted at a leading end of an arm 11 is fixed on the bottom surface of a chassis 2 in the same manner as that in the above first embodiment. An upper plate 30 is fixed on the chassis 2 so as to face the bottom surface of the chassis 2 and be separated from the bottom surface of the chassis 2 by a predetermined distance. A concave part 30a is formed at an end of the upper plate 30 so that the upper plate 30 is prevented from contacting the magnetic head assembly 8. A slider plate 32 is provided between the bottom surface of the chassis 2 and the upper plate so as to be capable of sliding in a inserting direction in which the disk cartridge 4 is inserted into this disk driving unit and an ejecting direction in which the disk cartridge 4 is ejected from this disk driving unit. The inserting direction is shown by B in FIG. 10, and the ejecting direction is shown by A in FIG. 10. The slider plate 32 has a concave part 32g which is formed at an end there of so as to avoid the magnetic head assembly 8. The concave part 32g of the slider plate 32 has substantially the same shape as that of the upper plate 30. The slider plate 32 also has a side plate 32f which is formed at a side end thereof so as to be perpendicular to the bottom surface of the chassis 2. A spring 30 is provided between a hook part 30a formed at a side of the upper plate 30 and the side plate 32f so that the slider plate 32 is maintained in a state where the slider plate 32 is always pulled in the ejecting direction. Slotted holes 32a, 32b, 32c and 32d which extend in the inserting and ejecting directions are formed at corners of the slider plate 32. Respective screws 33a, 33b, 33c and 33d which project from the upper plate 30 toward the bottom surface of the chassis 2 are loosely engaged with the respective slotted holes 32a, 32b, 32c and 32d. The slider plate 32 is guided by the screws 33a, 33b, 33c and 33d so as to slide on the chassis 2.

An engagement plate 32e is formed at a rear end of the slider plate 32 so as to be adjacent to the side plate 32f. A latch lever 35 is provided close to the engagement plate 32e. The latch lever 35 is pivotably supported on a pin 35a which is fixed on the bottom surface of the chassis 2. A torsion spring 38 is wound around the pin 35a and an end of the torsion spring 38 is engaged with a stopper pin 40 which is fixed on the bottom surface of the chassis 2. A force produced by the torsion spring 38 always operates on the latch lever 35 in the counterclockwise direction. The latch lever 35 has a latch part 35b, and the latch part 35b and the engagement plate 35e of the slider plate 35 are engaged with each other under a condition where the disk cartridge 4 is not loaded into this disk driving unit.

Figure 11:
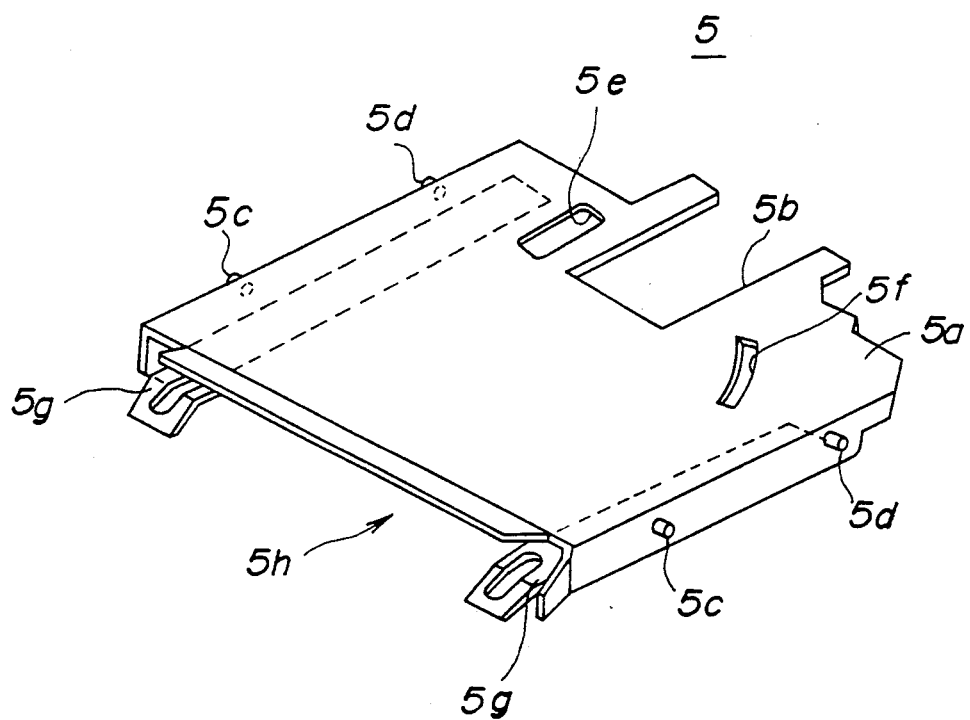
FIG. 11 is a perspective view of a cartridge holder.
Figure 12:
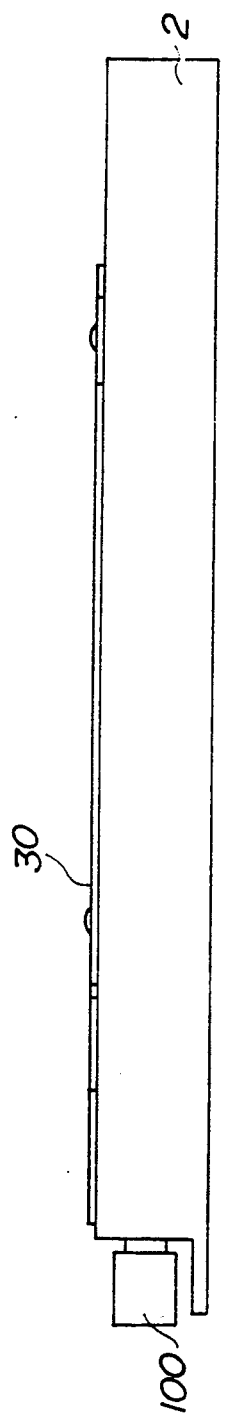
FIG. 12A is a side view of the disk driving unit.
FIG. 12B is a cross sectional view of the disk driving unit in a state where the disk cartridge is not loaded at the loading position.

A holder (hereinafter referred to as a cartridge holder) 5 is provided between the bottom surface of the chassis 2 and the slider plate 32 so as to be able to move up and down in a direction perpendicular to the bottom surface of the chassis 2. The cartridge holder 5 has substantially the same structure as the holder 5 in the above first embodiment, and is formed, for example, as shown in FIG. 11. That is, guide plates 5g are formed at both sides of the cartridge holder 5 so as to be parallel to an upper plate 5a of the cartridge holder 5. The disk cartridge 4 is inserted from an inlet 5h formed at a front end of the cartridge holder 5 into the cartridge holder 5 so as to be guided by the guide plates 5g. Pins 5c and 5d are formed on both side walls of the cartridge 5. The pin 5c is slidably engaged with a guide hole 36a formed on the side plate 32f of the slider plate 32, as shown in FIG. 12B. The pin 5d is slidably engaged with a guide hole 36b also formed on the side plate 32f. The guide holes 36a and 36b are parallel to each other and inclined with respect to the bottom surface of the chassis 2. Thus, when the slider plate 32 slides in the inserting and the ejecting directions, the pins 5c and 5d of the cartridge holder 5 move along the guide holes 36a and 36b, so that the cartridge holder 5 moves upward and downward.

An opening 5e is formed on the upper plate 5a of the cartridge holder 5. A protector block 17 is provided on the cover 16 (not shown) so as to project from the cover 16 in the same manner as that in the above first embodiment. The protector block 17 passes through the opening 5e of the cartridge holder 5. In addition, a shutter lever 6 which is used to open a shutter of the disk cartridge 4 inserted in the cartridge holder 5 is provided on the upper plate 5a of the cartridge holder 5, in the same manner as that of the first embodiment. That is, the shutter lever 6 is pivotably supported on a pin 6b, and a force of a coil spring 7 always operates on the shutter lever 6 in the clockwise direction. An engagement pin 6a, which is engaged with the shutter of the disk cartridge 4, is fixed on an end of the shutter lever 6. The engagement pin 6a projects from the shutter lever 6 via an opening 5f formed on the upper plate 5a of the cartridge holder 5 inside the cartridge holder 5.

A movable protector unit 50 is mounted adjacent to the magnetic head assembly 8 on the bottom surface of the chassis 2. The movable protector unit 50 is formed as shown in FIGS. 13 and 14.

Figure 13:
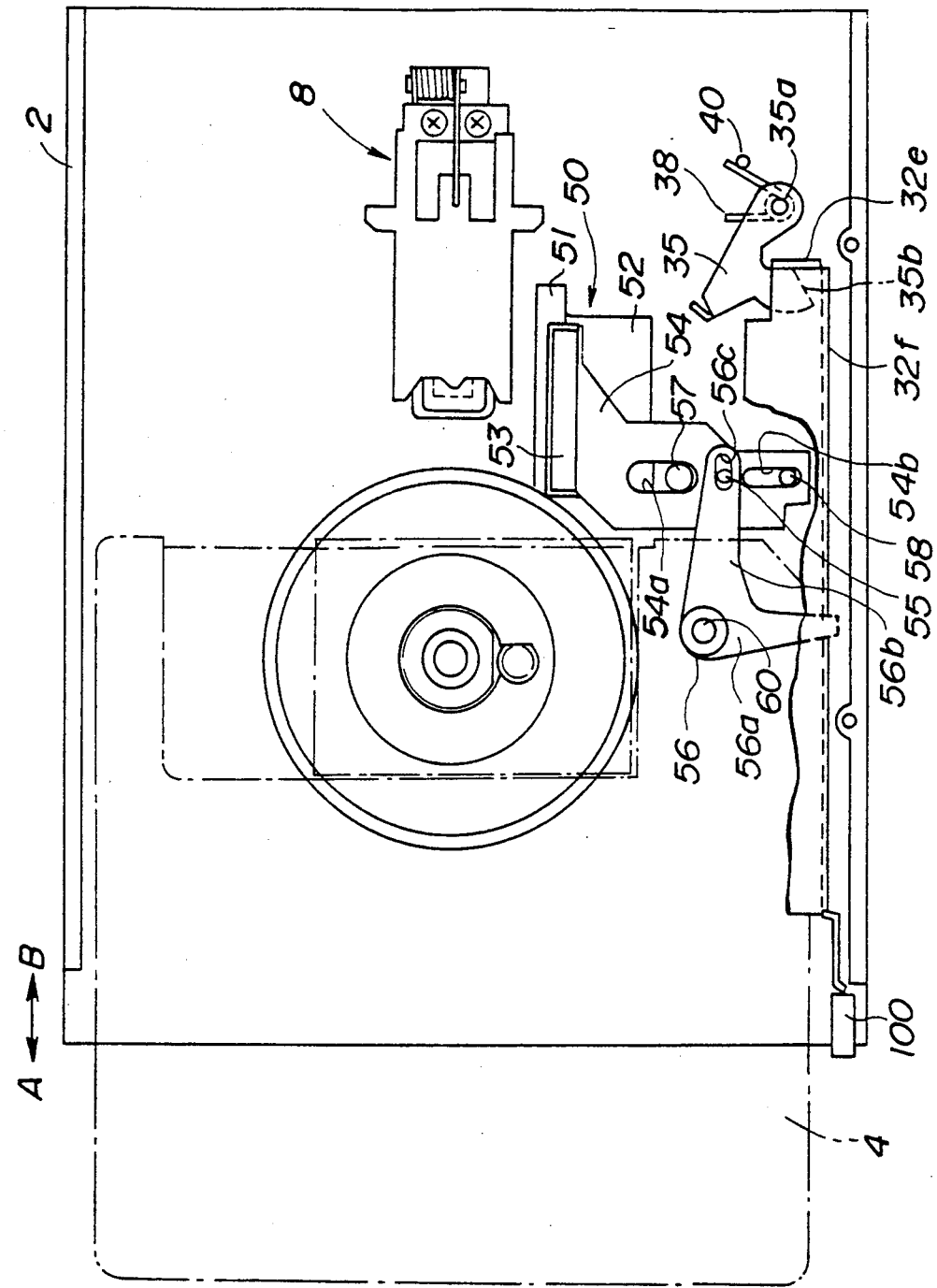
FIG. 13 is a plane view of the disk driving unit in a state where the disk cartridge is not loaded at the loading position.
Figure 14:
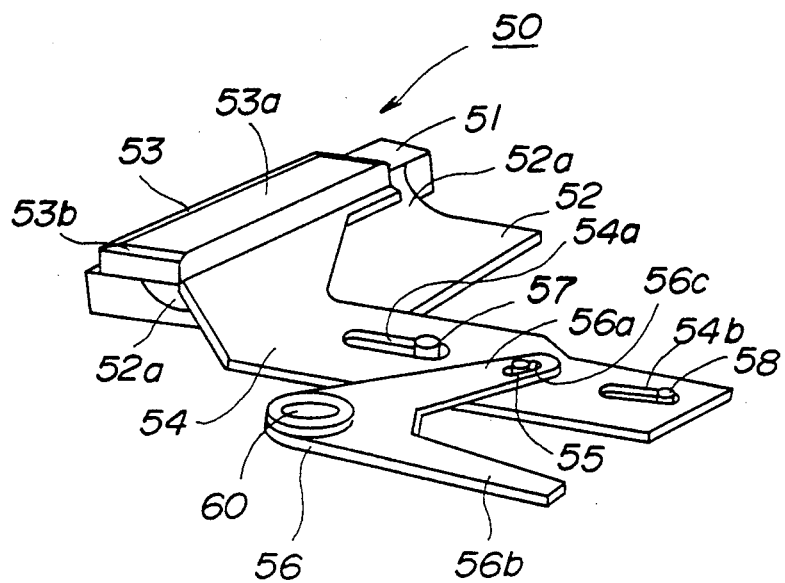
FIG. 14 is a perspective view of a movable protector.

Referring to FIGS. 13 and 14, a supporting block is formed of a supporting base 51 extending in the inserting and ejecting directions and a supporting plate 52 which is connected to the supporting base 51 by a curved surface 52a having a concave shape. The supporting block is mounted on the bottom surface of the chassis 2. A movable block is formed of a protector 53 and a movable plate 54 which is integrated with the protector 53 and extends in a direction perpendicular to the inserting and ejecting directions. Slotted holes 54a and 54b which extend in a direction perpendicular to the inserting and the ejecting directions are formed on the movable plate 54. Respective pins 57 and 58 which are fixed on the bottom surface of the chassis 2 are loosely engaged with the slotted holes 54a and 54b, so that the movable plate 54 is capable of moving in a direction perpendicular to the inserting and ejecting directions under a condition where the movable plate 54 is guided by the pins 57 and 58. When the movable plate 54 moves, the protector 53 slides on the supporting block in the inserting and ejecting directions. When the protector 53 slides on the supporting block, the protector 53 moves up and down between the supporting base 51 and the supporting plate 52.

A lever 56 is formed on a first arm 56a which extends in a direction perpendicular to the inserting and the ejecting directions and a second arm 56b perpendicular to the first arm 56a. The lever 56 is pivotably supported on a shaft 60 on the bottom surface of the chassis 2. An end of the first arm 56a of the lever 56 is engaged with a concave part 32h formed on the side plate 32f of the slider plate 32 (see FIG. 12). A slotted hole 56c is formed at an end of the second arm 56b of the lever 56. A pin 55 fixed on the movable plate 54 is loosely engaged with the slotted hole 56c.

In the above movable protector unit 50, when the slider plate 32 slides in the inserting direction and the ejecting directions, the lever 56 pivots on the shaft 60 in the counterclockwise direction and the clockwise direction. When the lever 56 pivots on the shaft 60, the movable block of the movable protector unit 50 slides on the supporting block in a direction perpendicular to the inserting and the ejecting directions. The protector 53 has a slide surface 53a and an inclined part 53b the same as those of the protector block 17 in the first embodiment. The movable block and the supporting block are formed of synthetic resin, and the surface of the protector 53 has a low friction resistance.

Figure 15:
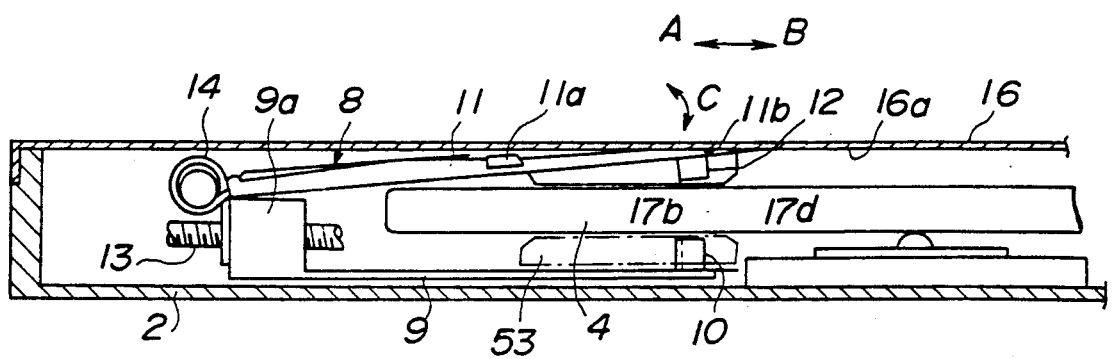
FIG. 15 is a cross sectional view of the disk driving unit in a state where the disk cartridge is loaded at the loading position.

After the disk cartridge 4 is inserted into the cartridge holder 5 and before the disk cartridge 4 is completely loaded at a loaded position, a relationship among the disk cartridge 4, the protector block 17 and the protector 53 of the movable protector unit 50 is in a state shown in FIG. 15. In FIG. 15, the cartridge holder 5 is omitted. Referring to FIG. 15, a relationship among the protector block 17, the disc cartridge 4 and the upper head 12 is in the same state as that shown in FIG. 6. For example, the distance between the lower end of the upper head 12 and the slide surface 17b of the protector block 17 is approximately 0.2 mm, and the distance between the slide surface 17b of the protector block 17 and the upper surface of the disk cartridge 4 is approximately in a range between 0 and 0.2 mm. In addition, the relationship between the movable protector 50 and the disk cartridge 4 is almost the same as that between the protector block 17 and the disk cartridge 4. For example, the distance between an upper end of the lower head 10 and the slide surface 53a of the protector 53 is approximately in a range between 0 and 0.4 mm, and the distance between the slide surface 53a of the protector 53 and the disk cartridge 4 is approximately in a range between 0 and 0.2 mm. In a case where the protector block 17 and the movable protector unit 50 are respectively provided under the above condition, even though there are dimensional tolerances and deformation in the disk cartridge 4, the disk cartridge 4 is sandwiched between the protector block 17 and the movable protector unit 50. Thus, when the disk cartridge 4 is inserted in the cartridge holder 5, the disk cartridge 4 can be prevented from being brought into contact with the upper head 12 and the lower head 10.

Figure 16:
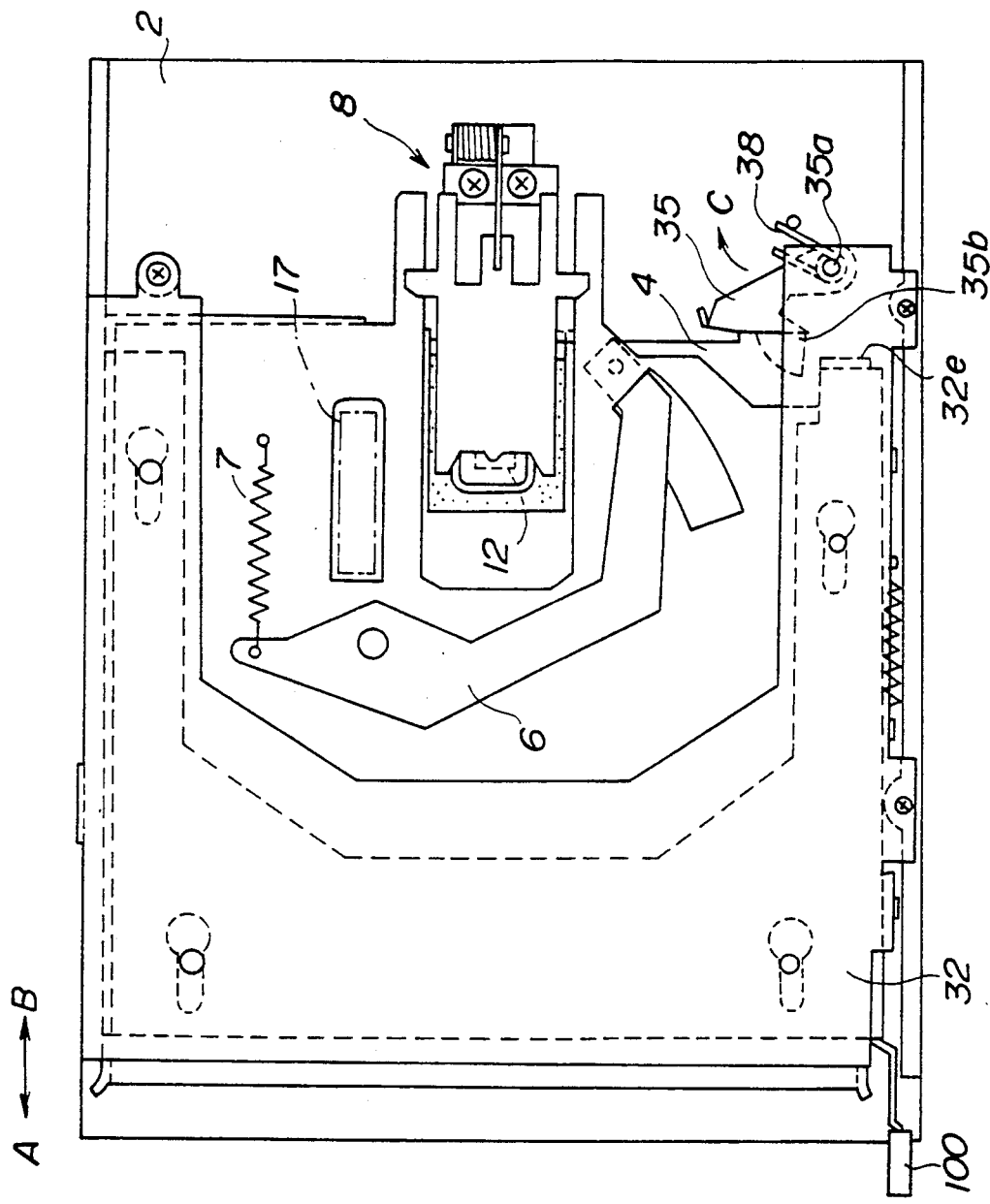
FIG. 16 is a plane view of the disk driving unit in a state where the disk cartridge is loaded at the loading position.
Figure 18:
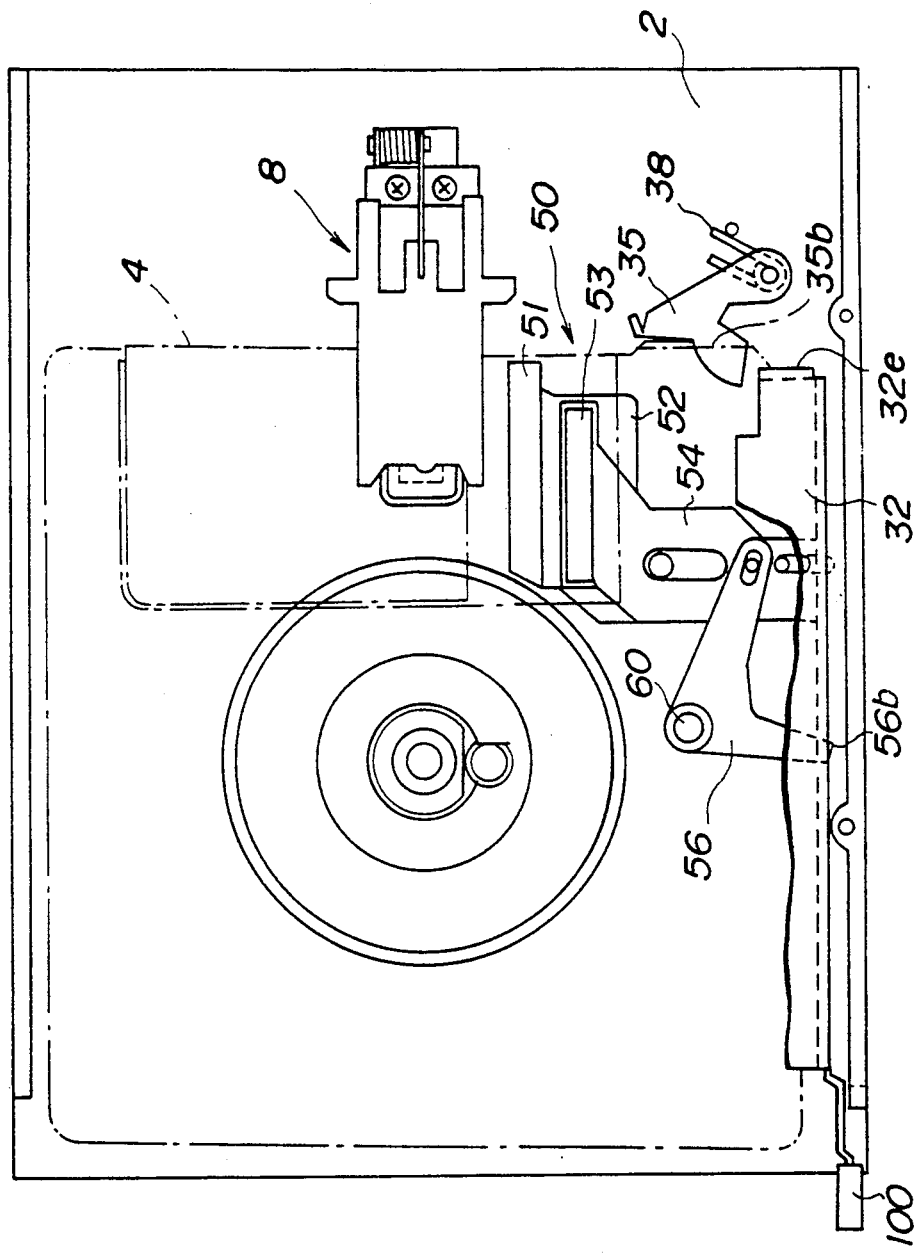
FIG. 18 is a plan view of the disk driving unit including the movable protector in a state where the disk cartridge is loaded at the loading position.

When the disk cartridge 4 is further inserted in the cartridge holder 5 and the leading end of the disk cartridge 4 pushes the latch lever 35, the latch lever 35 pivots on the pin 35a in the clockwise direction shown by C in FIG. 16. Then, when the latch part 35b of the latch lever is disengaged from the engagement plate 32e of the slider plate 32, the slider plate 32 is slid in the ejecting direction (the direction A) by a force of the spring 34. When the slider plate 32 slides in the ejecting direction, the pins 5c and 5d of the cartridge holder 5 are guided by the guide holes 36a and 36b on the side plate 32f so that the cartridge holder 5 moves downward, as shown in FIG. 17. In addition, when the slider plate 32 slides in the ejecting direction, the lever 56 pivots on the shaft 60 in the clockwise direction. The movable plate 54 moves so as to recede from the magnetic head assembly 8, as shown in FIGS. 18 and 19, so that the protector 53 slides on the supporting block from the supporting base 51 via the curved surface 52a to the supporting plate 52. That is, the protector 53 moves downward.

Figure 20:
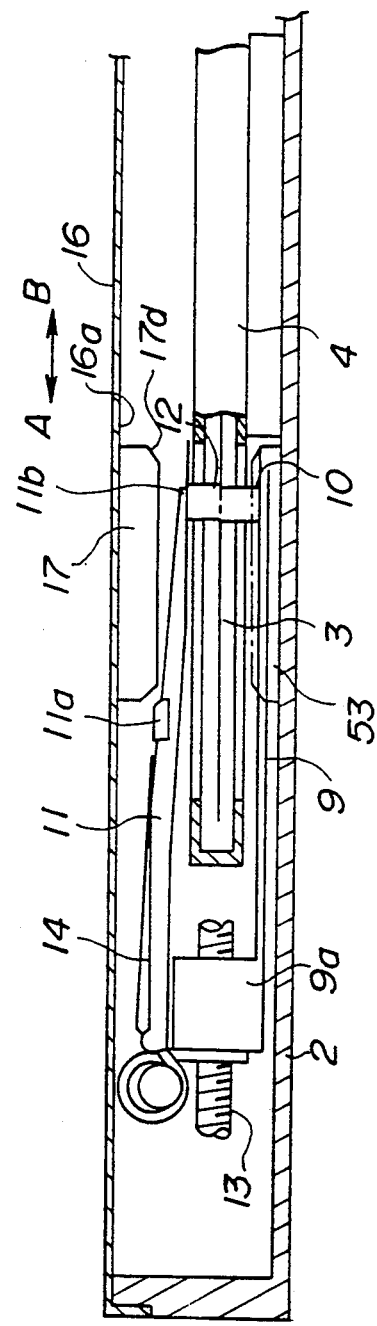
FIG. 20 is cross sectional view of the disk driving unit in a state where the disk cartridge is loaded at the loading position.

When the cartridge holder 5 and the protector 53 moves completely downward, the disk cartridge 4 is loaded at the loaded position. At this time, the shutter of the disk cartridge 4 is opened by the shatter lever 6, in the same manner as that in the first embodiment, and then the upper head 12 and the lower head 10 are brought via the opening of the disk cartridge 4 into contact with the surfaces of the magnetic disk 3, as shown in FIG. 20.

In a state where the disk cartridge 4 is loaded at the loaded position, the eject button 100 which is integrated with the slider plate 32 is pushed, the slider lever 32 moves in the inserting direction. The pins 5c and 5d of the cartridge holder 5 are moved in the guide holes 36a and 36b formed on the side plate 32f in accordance with the moving of the slider plate 32. As a result, the cartridge holder 5 moves upward. Then, when the cartridge holder 5 reaches a predetermined position, the latch lever 35 pivots on the pin 35a in the counterclockwise direction due to the operation of the torsion spring 38. The latch lever 35 which pivots on the pin 35a pushes the disk cartridge 4 in the ejecting direction, so that the disk cartridge 4 is ejected from this disk driving unit. When the slider plate 32 moves in the inserting direction as described above, the lever 56 pivots on the shaft 60 in the counterclockwise direction. The movable plate 54 moves toward the magnetic head assembly 8 in accordance with the pivoting of the lever 56. At this time, the protector 53 slides on the supporting block from the supporting plate 52 via the curved surface 52a to the supporting base 51. That is, the protector 53 moves upward onto the supporting base 51. When both the cartridge holder 5 and the protector 53 move upward, the relationship among the upper head 12, the lower head 10, the disk cartridge 4, the protector block 17 and the protector 53 is obtained as shown in FIG. 15. Thus, when the disk cartridge 4 is ejected from the disk driving unit, the upper head 12 and the lower head 10 are protected from the disk cartridge 4.

According to the above second embodiment, when the disk cartridge 4 is inserted into and ejected from the disk driving unit, the protector block 17 and the movable protector unit 50 protect the upper head 12 and the lower head 10 from the disk cartridge 4. Thus, even if the disk driving unit becomes thinner, the upper head 12 and the lower head 10 can be protected from being damaged by the disk cartridge 4.

For example, the disk driving unit having 12.7 mm (½ inch) thickness was manufactured, based on the present invention. In this disk driving unit, the floppy disk in the disk cartridge having 3.3 mm±0.2 thickness was stably driven.

The present invention is not limited to the aforementioned embodiments, and variations and modifications may be made without departing from the scope of the claimed invention. For example, the present invention can be also applied to an optical disk apparatus having an optical head, a magneto-optic disk apparatus having a magnetic head and optical head and the like.

What is claimed is:

1. A loading unit for loading a case housing a disk recording medium at a loading position which is set between a first head and a second head, the first head recording information in and/or reproducing information from a first side of the disk recording medium, the second head recording information in and/or reproducing information from a second side of the disk recording medium, said loading unit comprising:

an insertion path for guiding said case inserted from an insertion opening toward a position between said first head and said second head;

a loading mechanism for moving said case toward said second head and for loading said case at the loading position when said case reaches a predetermined position in said insertion path; and a first protector member having a first slide surface, said first protector being provided close to the first head so that a first distance between the first slide surface and a first surface of said case is less than or equal to a second distance between the first surface of said case and the first head in a state where said case is in said insertion path, the first surface of said case facing the first head.

2. A loading unit as claimed in claim 1, wherein the first slide surface of said first protector member is in contact with the first surface of said case in the state where said case is in said insertion path.

3. A loading unit as claimed in claim 1, wherein said first protector member has a block which extends in a direction in which said case is inserted, the first slide surface being formed on said block.

4. A loading unit as claimed in claim 2, wherein said first protector member has a block which extends in a direction in which said case is inserted, said block having the first slide surface which is formed of a plurality of areas which are in contact with the first surface of said case in the state where said case is in said insertion path.

5. A loading unit as claimed in claim 1, wherein a difference between the first distance and the second distance is a value within a range between 0 and 0.4 mm.

6. A loading unit as claimed in claim 1, wherein a difference between the first distance and the second distance is approximately 0.2 mm.

7. A loading unit as claimed in claim 1, wherein the first distance is approximately 0.

8. A loading unit as claimed in claim 1, further comprising:

a second protector member having a second slide surface, said second protector being provided close to the second head so that a third distance between the second slide surface and a second surface of said case is less than or equal to a fourth distance between the second surface of said case and the second head in a state where said case is in said insertion path, the second surface of said case facing said second head; and a protector moving mechanism, operatively connected to said loading mechanism, for moving said second protector in a predetermined direction so that said case is prevented from moving when the loading mechanism moves said case toward said second head.

9. A loading unit as claimed in claim 8, wherein the second slide surface of said second protector member is in contact with the second surface of said case in the state where said case is in said insertion path.

10. A loading unit as claimed in claim 8, wherein said second protector member has a block which extends in a direction in which said case is inserted, the second slide surface being formed on the block.

11. A loading unit as claimed in claim 9, wherein said protector moving mechanism has a mechanism for moving said second protector member from a first position to a second position, the first position corresponding to a position at which said insertion path is provided, the second position corresponding to the loading position.

12. A loading unit as claimed in claim 11, wherein said mechanism comprises a supporting block and a moving mechanism, the supporting block having a first surface corresponding to the first position, a second surface corresponding to the second position and a connecting surface connecting the first surface and the second surface to each other, and the connecting surface having a concave curved shape, the moving mechanism moving said second protector member from the first surface via the connecting surface to the second surface on the supporting block.

13. A loading unit as claimed in claim 8, wherein a difference between the third distance and the fourth distance is a value within a range between 0 and 0.4 mm.

14. A loading unit as claimed in claim 8, wherein a difference between the third distance and the fourth distance is approximately 0.2 mm.

15. A loading unit as claimed in claim 8, wherein the third distance is approximately 0.

* * * * *